Jan. 6, 1925.
L. H. MORRILL
CIGAR LIGHTER
Filed Jan. 9, 1922
1,521,901
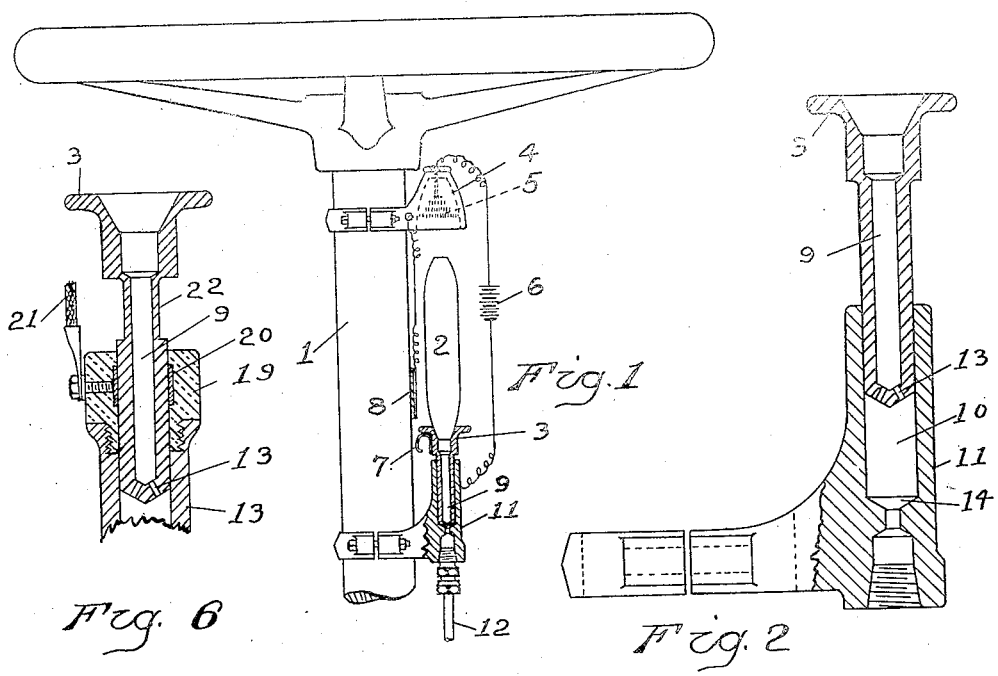
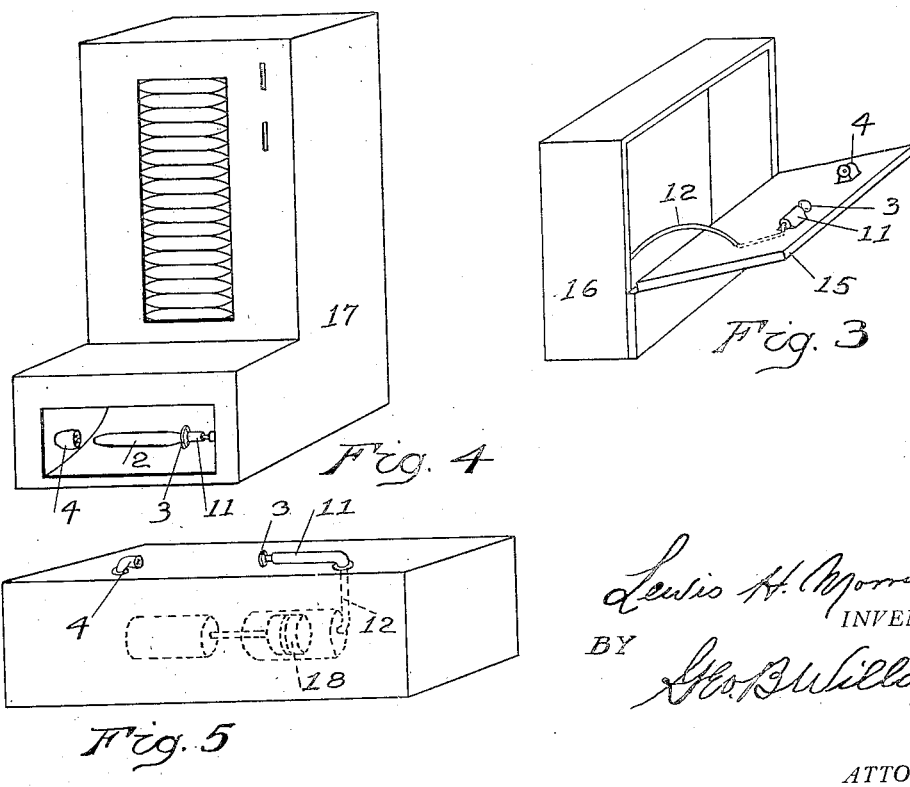
Lewis H. Morrill
INVENTOR
BY
ATTORNEY Patented Jan. 6, 1925.

1,521,901

UNITED STATES PATENT OFFICE.

LEWIS H. MORRILL, OF SAGINAW, MICHIGAN.

CIGAR LIGHTER.

Application filed January 9, 1922. Serial No. 527,877.

*To all whom it may concern:*

Be it known that I, LEWIS H. MORRILL, a citizen of the United States, residing at Saginaw, in the county of Saginaw and State of Michigan, have invented certain new and useful Improvements in Cigar Lighters; and I do hereby declare the following to be a full, clear, and exact description of the invention, such as will enable others skilled in the art to which it appertains to make and use the same.

This invention relates to lighters and pertains more particularly to cigar and cigarette lighters adapted to be used on automobiles and other vehicles and also in conjunction with vending machines, humidors and other receptacles and on counters of cigar stores, etc.

My improvement pertains more particularly to a cigar lighter having an electrically heated lighting element, a vacuum suction device co-acting with the lighting element to light the cigar or cigarette, and means whereby the cigar while subjected to suction may be brought toward and away from the lighting element.

The purpose of my invention is more particularly to provide means whereby one end of the cigar or cigarette may be inserted in a suitable mouth-piece and the other end brought into proximity to a heating element, the arrangement being such that when the cigar and heating element are brought into proximity the electric current will be automatically sent through the heating element and suction will automatically be produced at the mouth-piece, whereby the article will be automatically lighted and drawn upon in substantially the same manner as when it is lighted by a smoker in the usual manner.

With the foregoing and certain other objects in view which will appear later in the specification, my invention comprises the devices described and claimed and the equivalents thereof.

In the drawings, Fig. 1 is a side view of the steering wheel post of a motor vehicle with my improvement attached, the lighter being shown partly in section and the electric wiring being indicated diagrammatically.

Fig. 2 is a part sectional side view of one form of the mouth-piece and its connected parts.

Fig. 3 is a diagrammatic view showing the device adapted for use with a humidor or other box-like receptacle.

Fig. 4 is a perspective view of a cigar vending machine with my improved lighter applied thereto.

Fig. 5 is a diagrammatic perspective view of the lighter mounted upon a box of the kind adapted to be installed on the counter of a cigar store.

Fig. 6 is a sectional detail of an improved form of mouth-piece, and contact switch for automatically opening and closing the electric circuit through the lighter.

As is clearly shown in the drawings, 1 represents the steering post of an automobile or similar vehicle. 2 is the article, as a cigar, to be lighted. 3 is the mouth-piece into which one end of the cigar is inserted. 4 is an electric heater or similar device by which the other end of the cigar is lighted.

The heater may conveniently comprise the usual heating element 5 suitably supported on a steering post 1 or other stationary object.

6 is a battery or other source of electric current connected by suitable wiring through a suitable make-and-break device 7, 8, with the heating element 5, so that when the members 7 and 8 are in contact, current from battery 6 renders the heating element 5 incandescent.

The contact between members 7 and 8 is preferably established by moving the mouth-piece 3 with cigar or cigarette 2 toward and from the heating element 5, the mouth-piece 3 being made movable for the purpose.

In practice I prefer to provide the mouth-piece 3 with a hollow tubular stem or shank 9 longitudinally slidable in the bore 10 of a bracket 11, which may also be carried upon the steering post 1, or other suitable support, the bracket 11 being mounted in fixed relation to the heating element 5, while the mouth-piece 3 is movable toward and from the heating element, the tubular stem 9 telescoping with the tubular part of the bracket 11, as shown in Figs. 1 and 2.

The bore 10 of bracket 11, communicates, by means of a tube or pipe 12, with any suitable chamber under reduced pressure or partial vacuum, as for example the suction chamber of an automobile engine, although the desired suction may be obtained from any other convenient source.

The lower end of the hollow tubular stem 9 communicates with the bore of bracket 11, as by means of perforations 13, in its lower end, which fits the end 14 of the bore 10 when the stem is shoved clear in. Thus the perforated end of the stem 9 and the end 14 of the bore serve as a valve to close the tube 12 when the mouthpiece 3 is down and to automatically open the tube 12 and thereby subject the cigar to suction automatically when the mouthpiece 3 is drawn out, as shown in Fig. 2.

Illustrations in Figs. 3, 4, and 5 are intended merely to indicate other adaptations of the same general arrangement of the heater and of the extensible mouth-piece and the suction pipe.

In Fig. 3 these parts are mounted on the cover 15 of a suitable box or case 16, which may be a humidor.

In Fig. 4, the same arrangement is applied to a cigar vending machine 17.

In Fig. 5, the box may contain a vacuum producing device consisting of an electrically actuated plunger and cylinder, indicated diagrammatically at 18, or by any other suitable suction producing device.

In Fig. 1, I have shown the contact members 7 and 8 diagrammatically, as a spring wiper 7, adapted to contact with an insulated plate 8 electrically connected to one terminal of the heating element 5, but in practice I prefer the switch construction shown in Fig. 6, where 19 is a plug or cap of insulated material having a threaded boss screwed into the end of the tubular bracket 11.

Plug 19 contains an annular ring 20 of brass or other conducting material electrically in contact with the conduit 21, which may connect with one terminal of the heating element 5. The bracket 11 may be connected to the battery and to the other terminal, as indicated in Fig. 1.

Thus, when the mouth-piece is drawn out, as shown in Fig. 6, the hollow tubular stem and the annular ring 20 form part of the circuit through the battery and heater, but when the tube 3 is shoved clear in the contact is broken by reason of a circumferential groove 22 formed in the hollow tubular stem 9, the groove being of greater width than the width of the annular ring 20 and consequently the tubular stem 9 is then out of contact with the annular ring and the contact through the heater is broken.

While I have shown and described this construction of Fig. 6 as a preferred form, I do not desire to be understood as limiting myself to this exact construction, which is only one of numerous embodiments of the invention as set forth in the claims.

In use, the cigar is inserted in the mouthpiece 3 and the mouth-piece and the cigar are drawn toward the heater 5. The perforations 13 are thus raised from the seat 14 at the end of the bore 10 and suction is produced on the cigar by means of the tube 12, and simultaneously contact is established through parts 7, 8 or 9 and 20 and the current from battery 6 or other source produces incandescence in the heating element 5. Thus the cigar is automatically lighted, whereupon the cigar is pushed downward, thus breaking the circuit and closing the suction pipe 12 and the cigar or cigarette is removed from the mouth-piece 3.

By the means above described I have produced a simple and relatively inexpensive device whereby the cigar is automatically lighted and suction is simultaneously applied.

The whole operation is performed in practice by simply inserting the cigar in the mouth-piece, moving the cigar and mouthpiece toward the lighter and after the cigar is well lighted, the mouth-piece 3 is pushed back to its original position and the cigar is removed.

Having thus described my invention, what I claim and desire to secure by Letters Patent is:

1. In a lighter for cigars and the like, in combination, a mouth-piece adapted to receive one end of the cigar, a suction device connected to said mouth-piece, a heating element located in proximity to the other end of said cigar, said mouth-piece and heating element relatively movable toward and from each other, a make-and-break device actuated by said mouth-piece to open and close the circuit of said heating element and means adapted to produce suction in said mouth-piece when said mouth-piece is moved to close said circuit.

2. In a lighter for cigars and the like, in combination, a mouth-piece adapted to receive one end of the cigar, a suction device connected to said mouth-piece, a heating element located in proximity to the other end of said cigar, said mouth-piece and heating element relatively movable, an automatic suction valve actuated by said mouth-piece, an automatic switch adapted to make-and-break the circuit to said heating element, said switch actuated by said mouth-piece, for the purposes set forth.

3. In a device of the class described, in combination with an incandescent heater and a mouth-piece movable toward and from said heater, a suction device connected to said mouth-piece, a tubular bracket, a mouth-piece stem slidable therein, and a valve actuated by the movement of said stem to open and close said source of suction, for the purposes set forth.

LEWIS H. MORRILL.